United States Patent [19]
Henry et al.

[11] 3,811,028
[45] May 14, 1974

[54] THERMOSTAT METAL AND METHOD OF MAKING

[75] Inventors: Ty Henry; Rene A. Dubuc, both of Attleboro, Mass.

[73] Assignee: Texas Instruments Incorporated, Dallas, Tex.

[22] Filed: June 24, 1969

[21] Appl. No.: 836,086

[52] U.S. Cl................ 219/117 R, 219/83, 29/480, 29/497.5
[51] Int. Cl............................................. B23k 11/06
[58] Field of Search ...... 219/82, 83, 117 R; 29/480, 29/497.5, 498

[56] References Cited
UNITED STATES PATENTS

| | | | |
|---|---|---|---|
| 3,628,235 | 12/1971 | Willoughby et al.................. | 29/480 |
| 3,475,816 | 11/1969 | Willoughby et al......... | 219/117 R X |
| 3,095,500 | 6/1963 | Jost................................. | 219/117 R |
| 3,092,715 | 6/1963 | Hallas........................... | 219/117 R |
| 2,414,511 | 1/1947 | Dyar............................ | 219/117 R X |

Primary Examiner—J. V. Truhe
Assistant Examiner—G. R. Peterson
Attorney, Agent, or Firm—Harold Levine; John A. Haug; James P. McAndrews

[57] ABSTRACT

An improved composite edgelay bimetal material useful as a thermostat metal is shown to have two relatively wide and thin strips of metal of different coefficients of thermal expansion interfacially bonded together along corresponding thin lateral edges of the respective strips, the interfacial bond being a metallurgical bond which is substantially complete along the strip edges. The bond formed between the edges of the metal strips does not significantly alter the properties of the strip materials adjacent the bond and therefore avoids a thermostatically inactive portion of the composite material at the location of the interfacial bond. The improved composite edgelay material is formed by disposing two metal rods of hexagonal cross-sectional configuration or the like so that narrow surfaces of the rods are engaged along the length of the rods. The rods are resistance welded together along said engaged surfaces and, preferably after treatment for improvement of the weld bond between the rods, the rods are deformed in a rolling mill or the like to reduce the rods into respective wide and thin metal strips which are secured together along thin lateral edges of the strips by said bond.

8 Claims, 9 Drawing Figures

PATENTED MAY 14 1974 3,811,028
SHEET 1 OF 2
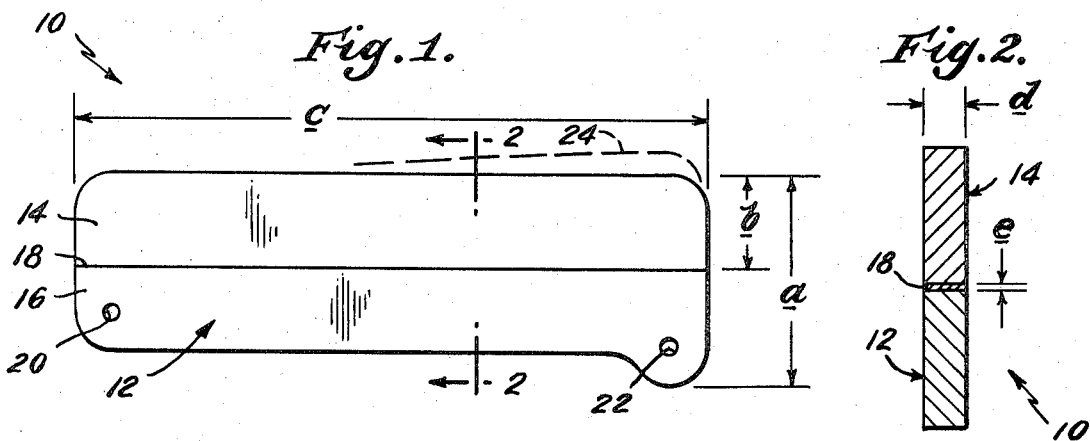
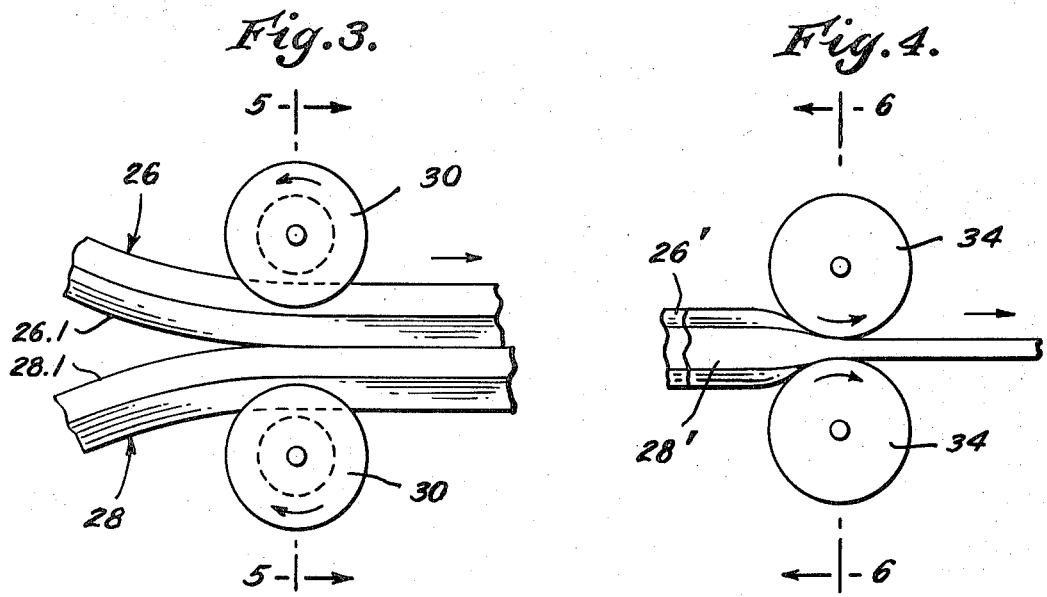
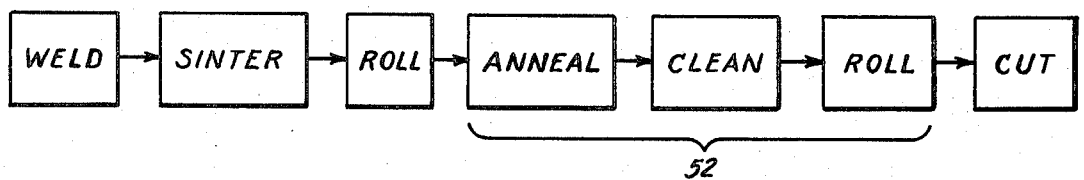
Inventors:
Henry Ty,
Rene A. Dubuc,
by James P. McAndrews
Att'y.

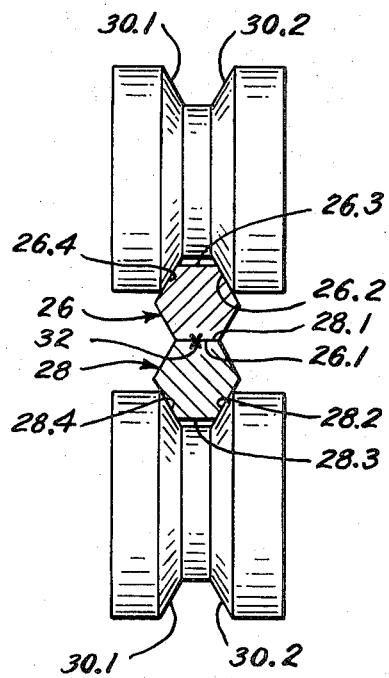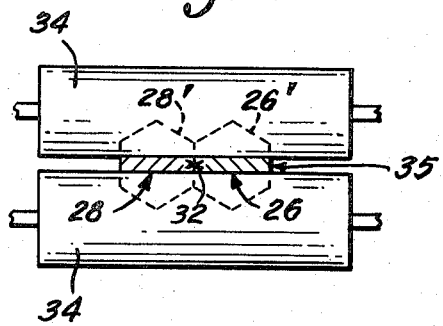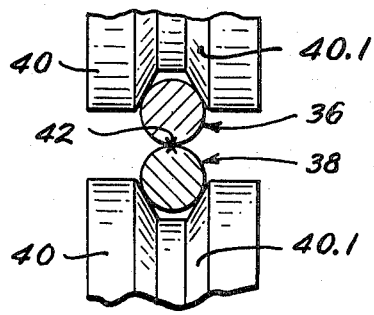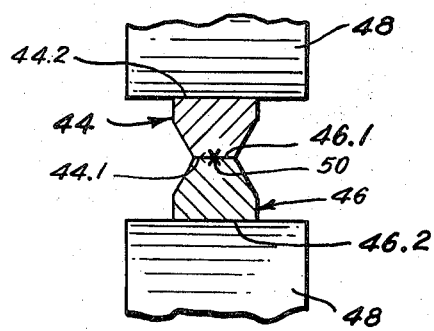

THERMOSTAT METAL AND METHOD OF MAKING

At the present time, composite edgelay bimetals used as thermostat metals embody relatively wide and thin metal strips of different coefficients of thermal expansion. These metal strips are secured together along thin edges of the strips. However, these composite materials are commonly made by means of an inert gas shielded arc weld or the like formed between the edges of the metal strips. As a result, the composite materials have an undesirably wide, porous, and thermostatically inactive weld stripe extending centrally along the length of the composite material. The porous quality of the weld weakens the bond between the metal strips and the presence of the wide weld stripe reduces the thermostatic activity or flexivity of the composite material. When such composite materials are annealed and reduced in thickness by rolling or the like to introduce a controlled degree of work-hardening into the composite material, as is frequently required, the undesirable weld stripe is further weakened and widened, thereby further reducing the reliability and thermostatic activity of the composite material. Frequently, when narrow thermostat metal parts are formed from such composite materials, the thermostatically inactive portion of the composite material at the location of the weld stripe will comprise a significant portion of the part width with the result that the part is able to display only limited thermostatic activity.

In another conventional process for making such composite edgelay bimetals, relatively thick bars of metal are pressure welded together in a rolling mill or the like. The bonded bars are then cut or sliced in a direction lengthwise of the bars and transversely of the plane of the pressure weld to form thin elements which each embody two relatively wide and thin strips of metal bonded together along thin edges of the strips. In this process, substantial rerolling of the thin elements is usually required, and the bonds which remain after such rolling are frequently incomplete or of poor quality. The process is also expensive to perform and wastes a substantial amount of the original bar material during the cutting or slicing of the thin elements from the initially bonded metal bars.

It is an object of this invention to provide a novel and improved composite edgelay bimetal material having two relatively wide and thin strips of metal bonded together along thin lateral edges of the metal strips; to provide such a composite material which is particularly useful as a thermostat metal; to provide such a composite edgelay bimetal which is substantially free of a thermostatically inactive portion at the location of the bond between the metal strips embodied in the composite material; to provide such a composite edgelay material in which the interfacial bond formed between lateral edges of the metal strips embodied therein is a substantially complete metallurgical bond and is free of pores; to provide a novel and improved method for making such composite edgelay bimetal material; to provide such a method which achieves a strong and complete metallurgical bond between the metal strips embodied in the composite material; to provide such a method which avoids formation of an undesirably wide weld stripe in the composite material; and to provide such a method which is easily and economically performed by use of equipment generally available to thermostat metal manufacturers.

Briefly described, the novel and improved method of this invention includes the steps of disposing two metal rods of round, hexagonal or other suitable cross-sectional configuration so that long and narrow surfaces of the rods extending along the lengths of the rods are engaged with each other and so that other long and narrow surfaces of the rods of relatively greater surface area are disposed to be contacted by electrical resistance welding electrodes for resistance welding the rods together. For example, in a preferred embodiment of this invention, rods of hexagonal cross-sectional configuration are continuously advanced between the resistance welding rolls of conventional seam welding apparatus so that corresponding flat surfaces of the rods extending along the lengths of the rods are continuously brought into engagement with each other between the welding rolls and so that two or more flat surfaces of each rod are continuously brought into contact with the respective welding roll surfaces, thereby to grip or press the rods together between the rolls while directing electrical current through the rods for resistance welding the engaged rod surfaces together. Preferably, the welded rods are then heated to an elevated temperature for a suitable period of time for sintering the weld or bond between the rods, thereby to complete the bond between the engaged rod surfaces by diffusion between the rod materials. Particularly where the rod materials include iron or iron alloys, the sintering temperature to which the rods are subjected is sufficiently high to dissolve all oxides from the engaged rod surfaces into the rod materials so that complete diffusion bonding can occur, thereby to completely bond the engaged rod surfaces together.

In accordance with this invention, the rod materials are then deformed into respective flat and thin, strip configurations to form a composite edgelay bimetal material in which the strips formed by the rod deformation are bonded or welded together along thin lateral edges of the strips by means of the resistance weld or bond described above. For example, in a preferred embodiment of this invention, the welded rods, after treatment for bond improvement, are advanced between a pair of rolls of a conventional rolling mill so that both rods contact each mill roll, the rods then being squeezed between the rolls to deform the rods into the described strip configurations. In this way, each of the rods is individually deformed between the rolls at one side of the bond formed between the rods to facilitate deformation without tending to excessively weaken the bond between the rods.

Other objects, advantages and details of this novel composite edgelay bimetal and of the novel and improved methods of this invention appear in the following detailed description of preferred embodiments of the invention, the detailed description referring to the drawings in which:

FIG. 1 is a front elevation view illustrating a thermostat metal part embodying a composite edgelay bimetal material;

FIG. 2 is a section view along line 2—2 of FIG. 1;

FIG. 3 is a partial diagrammatic view illustrating a step in the novel method of this invention;

FIG. 4 is a partial diagrammatic view illustrating a subsequent step in the method of FIG. 3;

FIG. 5 is a partial section view to enlarged scale along line 5—5 of FIG. 3;

FIG. 6 is a partial section view to enlarged scale along line 6—6 of FIG. 4;

FIGS. 7 and 8 are section views similar to FIG. 5 illustrating steps in alternate embodiments of the method of this invention; and FIG. 9 is a block diagram illustrating the sequence of steps in the method of this invention.

Referring to the drawings, 10 in FIGS. 1 and 2 indicates a thermostat metal part made from a composite edgelay bimetal material 12 which embodies a relatively wide and thin strip 14 of a first metal of relatively low coefficient of thermal expansion and a relatively wide and thin strip 16 of another metal of relatively high coefficient of thermal expansion. These metal strips are interfacially bonded together at 18 along corresponding thin lateral edges of the strips. In a typical part, the dimensions a, b, c and d may be 0.63, 0.25, 2.00, and 0.06 inches respectively. As will be understood, if such a thermostat metal part provided with apertures 20 and 22 is subjected to an increase in temperature while the portion of the part adjacent the aperture 20 is fixed in place, the differences in thermal expansion in the metal strips 14 and 16 will cause the part to flex or move to the position indicated by the dotted lines 24 in FIG. 1, this motion of the part being useful in temperature sensing devices and the like. This flexing movement subjects the interfacial bond 18 to considerable stress so that a high quality of bond is desirable. In addition, if the metal strips 14 and 16 are joined together by inert gas shielded arc welding or the like along the bond line 18, the bond line or weld stripe extending along the length of the part will have a substantial width e equal to approximately the thickness d of the composite material. This weld stripe portion of the composite material will tend to be thermostatically inactive and, particularly where the part is long and narrow so that the weld stripe occupies a substantial portion of the part width, will tend to significantly reduce the thermostatic activity or flexivity of the part 10. It is therefore desirable to maintain a very narrow bond stripe while achieving a high quality of bond at the location of the stripe.

In accordance with this invention, these objectives are economically achieved by forming the composite edgelay bimetal material in the manner illustrated in FIGS. 3–9. That is, in accordance with this invention, an elongated metal rod 26 having a hexagonal cross-sectional configuration or the like as shown in FIGS. 3 and 5 is advanced from a supply reel (not shown) so that a narrow, flat surface portion or stripe 26.1 extending along the length of the rod is engaged with a corresponding narrow, flat surface 28.1 of another elongated metal rod 28 being advanced from its respective supply reel (not shown). Preferably, as illustrated in FIGS. 3 and 5, the rods are engaged in the described manner by advancing the rods between a pair of welding electrode rolls 30 in a conventional electrical resistance welding apparatus. As will be understood, the rod 26 is formed of a metal of relatively low coefficient of thermal expansion while the rod 28 embodies a metal of relatively high coefficient of thermal expansion. In this arrangement, the cross-sectional configuration of the rods is selected so that, while relatively long and narrow surfaces 26.1 and 28.1 extending along the lengths of the rods are engaged with each other, substantially greater surface areas of the respective rods are disposed to be contacted by the welding rolls 30. Preferably the welding rolls are provided with selected groove configurations to facilitate making of electrical contact between welding roll surfaces and substantial surface areas of the rods. For example, where hexagonal rods are used as shown in FIG. 5, narrow rod surfaces 26.1 and 28.1 are disposed to be engaged with each other while surfaces 26.2, 26.3 and 26.4 and surfaces 28.2, 28.3 and 28.4 of the respective rods are disposed to be contacted by the welding rolls, the rolls having tapered groove surfaces 30.1 and 30.2 for contacting surfaces 26.2 and 26.4 of the rod 26 and surfaces 28.2 and 28.4 of the rod 28. In this arrangement, the metal rods 26 and 28 are gripped or squeezed together between the rolls 30 as the rods are brought into engagement with each other while, at the same time, electrical current is directed between the rolls through the rods 26 and 28. The large area of contact between the rolls and rods avoids significant heating of the roll-rod interfaces to avoid sticking of the rods to the welding rolls while the concentration of electrical current at the narrow interface between the rods themselves rapidly heats the rods at the surfaces 26.1 and 28.1 for resistance welding the rods together as indicated at 32 in FIG. 5. Where the metal rods are hexagonal as illustrated in FIG. 5, guiding of the rods into engagement with each other is easily accomplished and control of the surface areas of the rods contacted with each other and with the welding rolls is easily maintained.

As will be understood, in resistance welding the rods 26 and 28, the weld or metallurgical bond formed between the rod surfaces 26.1 and 28.1 preferably extends throughout these rod surfaces in order to achieve a high quality of bond between the rods. However, as formation of such a complete metallurgical bond frequently cannot be assured by the described resistance welding step above, the welded rods are preferably subjected to a suitable heat treatment or sintering step for assuring complete bonding of the rod surfaces 26.1 and 28.1 according to this invention. For example, the rods are preferably heated to a temperature above the recrystallization temperature of at least one of the rod materials and below the melting temperatures of the rod materials to permit completion of the weld or bond between the rod surfaces 26.1 and 28.1 by conventional diffusion bonding between the rod materials. Where one or more of the rods resistance welded together is formed of iron or an iron alloy or of another material in which metal oxides formed on the rod surfaces 26.1 and 28.1 would tend to inhibit diffusion bonding of the surfaces it is found that the rod materials are adapted to dissolve their own oxides within the rod materials at temperatures in the range from 0.5 to 0.7 of the absolute melting temperatures of the rod materials (as expressed in degrees Kelvin). Therefore, in these circumstances, the resistance welded rods are preferably heated to a temperature in the range from 0.5 to 0.7 of the absolute melting temperature of the lowest melting rod material, thereby to permit dissolution of oxides from the rod surfaces 26.1 and 28.1 and to permit complete diffusion bonding of these rod surfaces to one another.

In accordance with this invention, the welded rods 26 and 28 are then deformed by roll squeezing or the like for deforming each of the rods into a thin strip configuration in such a way that lateral edges of the thin strips formed by the rods are joined together by the resistance weld above described. For example, as illustrated in FIGS. 4 and 6, the welded rods 26 and 28 which had been contacted individually by the respective welding rolls 30 are passed between the rolls 34 of a conventional roll squeezing mill or the like so that each of the rods 26 and 28 contacts each of the rolls 34, whereby the rods are reduced in thickness to form each of the rods into a thin strip-like cross-sectional configuration. Dotted lines 26' and 28' in FIG. 6 indicate the configuration of the welded rods as advanced between the squeezing rolls 34. In this regard, it is noted that when rod materials are advanced through a rolling mill in this manner, the width of the rods is not substantially increased, the deformation of rods previously resulting in elongation of the rods to form an improved composite edgelay bimetal material 36 as illustrated in FIG. 6. In this way, it is found that the rods are readily deformed into thin strips having a thickness substantially smaller than the width of the rod faces 26.1 and 28.1 without any significant reduction in the quality of the bond formed between the individual strips. The composite edgelay bimetal material 36 is thus found to be of very high quality in that the strip materials embodied therein are well-bonded together and in that the bond stripe (indicated at 32 in FIG. 6) has no significant thickness, thereby avoiding any thermostatically inactive portion of the composite material 36 at the location of the bond stripe. In fact, where the composite material embodies welded thin-strip configuration each of which has a width to thickness ratio as great as 4:1, the bond stripe width in the plane of the width dimension of said stripe can equal as little as 1/10 or less of the thickness of the strip materials as formed by the method of this invention.

For example, in preparing a composite edgelay bimetal material 36 embodying Alloy B as the material of relatively low coefficient of thermal expansion and Alloy 10 as the material of relatively high coefficient of thermal expansion (see Table I below for the composition of Alloy B and Alloy 10), hexagonal rods 26 and 28 each measuring 0.375 inches between flat surfaces of the rods are advanced at a rate of 18 inches per minute into engagement with each other between the welding rolls 30 of a conventional seam welding apparatus. The rods are used as received from the manufacturer or are cleaned in a conventional pickling bath and fiber brush scrubbing line in conventional manner for removal of oils and other gross contaminants. The rods are subjected to a compressive force of approximately 450 pounds per square inch in the seam welder while a current or 450 amperes (220 volts) is directed between the welding rolls 30, thereby to resistance weld the rod surfaces 26.1 and 28.1 together. As these particular rod materials comprise iron alloys (each of the alloys embodies more than 50 percent iron by weight), the welded rods are then subjected to sintering in a conventional bell annealing apparatus for a period of about 10 to 30 minutes at a temperature in the range from about 2,050° to 2,150° F. Preferably, for example, the welded rods are sintered at a temperature of 2,100° F. for about 15 minutes, thereby to dissolve all oxides from the rod surfaces 26.1 and 28.1 into the rod materials and to permit complete diffusion bonding of the rod surfaces 26.1 and 28.1 to each other. Preferably, for avoiding excessive discoloration of the rod surfaces, the rods are sintered in a neutral or reducing atmosphere of nitrogen, hydrogen, or cracked city gas or the like. In accordance with this invention, the welded and sintered rods are then passed through a conventional rolling mill in the manner above described wherein the rods are subjected to from 30 to 70 percent reduction in thickness to form the individual rods into respective thin strip configurations. Desirably, for example, the rods are deformed into respective strips of approximately 0.375 inches in width having a thickness of about 0.115 inches and having corresponding thin lateral edges of the strips bonded together. In this way, the rods 26 and 28 are formed into the composite edgelay bimetal material 36 having the advantages previously described.

It should also be understood, that composite edgelay bimetal materials 36 can embody any selected metal materials within the scope of this invention. For example, any of the iron or iron alloy materials set forth in Table I below can be utilized according to the method of this invention, provided, of course, that the materials selected from the table display a suitable difference in coefficient of thermal expansion to provide the resulting composite bimetal material with the desired flexivity. As will be understood, the materials set forth in Table I are adapted to dissolve their own oxides therein when sintered for a suitable period of time at a temperature in the range from 0.5 to 0.7 of the absolute melting temperatures of the materials as expressed in degrees Kelvin.

TABLE I

| Alloy | Nickel | Chromium | Iron | Manganese | Aluminum | Molybdenum | Cobalt | Carbon |
|---|---|---|---|---|---|---|---|---|
| B | 22.0 | 3.0 | Bal. | | | | | 0.5 |
| C | 19.4 | 2.25 | Bal. | | | | | |
| D | 14.65 | | Bal. | 9.5 | 5.1 | | | |
| E | 25.0 | 8.5 | Bal. | | | | | |
| G | 18.0 | 11.5 | Bal. | | | | | |
| GA | 18.0 | 10.0 | Bal. | | | 3.0 | | |
| GB | 19.0 | 7.0 | Bal. | | | | | |
| H | 14.0 | | Bal. | 5.0 | | | | 0.5 |
| K | | | Bal. | | | | | |
| L | 25.0 | | Bal. | 4.0 | | | | |
| M | 8.0 | 18.0 | Bal. | | | | | |
| 15 | 32.0 | | Bal. | | | 1.0 | 1.0 | |
| 71 | | 16.5 | Bal. | | 4.5 | | | |
| 10 | 36.0 | | Bal. | | | | | |
| 11 | 38.65 | | Bal. | | | | | |
| 12 | 31.0 | 8.0 | Bal. | | | | 8.0 | |
| 13 | 32.0 | | Bal. | | | 1.0 | 15.0 | |
| 14 | 38.0 | 7.0 | Bal. | | | | | |
| 15 | 32.0 | | Bal. | | | 1.0 | 1.0 | |
| 20 | 40.0 | | Bal. | | | | | |
| 30 | 42.0 | | Bal. | | | | | |
| 40 | 45.0 | | Bal. | | | | | |
| 50 | 50.0 | | Bal. | | | | | |
| 70 | | 17.0 | Bal. | | | | | |

NOTE.—In accordance with conventional procedure, the alloys set forth in this table may also include small quantities of additional constituents present as impurities in the alloys.

Alternately other materials as set forth in Table II are also embodied in the composite edgelay material 36 within the scope of this invention.

TABLE II

| Alloy | Nickel | Manganese | Iron | Copper | Cobalt | Chromium |
|---|---|---|---|---|---|---|
| LA | 20.0 | 6.0 | Bal. | | | |
| P | 10.0 | 72.0 | | 18.0 | | |
| PA | 15.0 | 75.0 | | 10.0 | | |
| 80 | | | Bal. | | 57.0 | 9.0 |

In addition, copper, tungsten, various stainless steels, and other metals are also embodied in the composite material 36 within the scope of this invention.

It should be understood that the method of this invention is not limited to the use of hexagonal rods 26 and 28. For example, as illustrated in FIG. 7, round rods 36 and 38 can be advanced between pressure welding rolls 40 so that narrow surface stripes of the rods are resistance welded together as indicated at 42 in FIG. 7, the welding rolls 40 preferably being provided with rounded or tapered grooves 40.1 as shown to provide substantial areas of contact between the respective welding rolls and the round rods 36 and 38. Alternately, as shown in FIG. 8, six-sided rods 44 and 46 having respective relatively narrow surfaces 44.1 and 46.1 to be engaged with each other and having respective relatively wide surfaces 44.2 and 46.2 to engage flat welding rolls 48 are utilized, these rods being resistance welded together in the manner described as indicated at 50 in FIG. 8.

It should also be understood that although the composite material 36 is desirably formed in the manner above described, it is frequently desirable to incorporate a controlled degree of work-hardening in the composite material prior to use of the composite material in forming thermostat metal parts. For this purpose, the composite material formed in the manner above described is preferably annealed and subjected to additional rolling for introducing the desired degree of work-hardening while reducing the composite material to the desired gauge or thickness as illustrated in FIG. 9. For example, the composite material embodying Alloy B and Alloy 10 specifically described above, is preferably annealed for about 10 to 30 minutes in a nitrogen-hydrogen gas mixture (15 percent hydrogen) at a temperature from about 1,475° to 1,650° F. and is then rolled to a further reduced thickness. Preferably for example, this material is annealed at a temperature of 1,550° F. for about 15 minutes and is then rolled again to reduce the material thickness from about 0.115 to about 0.045 inches. Most desirably, the composite material is cleaned after said annealing and prior to said additional rolling by passing the annealed material through a conventional pickling bath and fiber brush scrubbing line for removal of any scale formed during annealing. If desired, the steps of annealing, cleaning and rolling as indicated at 52 in FIG. 9 are repeated several times to achieve the desired gauge prior to cutting of the composite material to form thermostat metal parts such as those illustrated in FIGS. 1 and 2.

It should be understood that although particular embodiments of this invention have been described by way of illustration, this invention includes all modifications and equivalents of the described embodiments which fall within the scope of the appended claims.

We claim:

1. A method for making a composite edgelay bimetal material having a pair of relatively wide and thin elongated metal strips each having a thin lateral edge surface joined throughout said edge surface to a corresponding thin lateral edge surface of the other of said strips, said method comprising the steps of forming a metallurgical bond between a relatively long and narrow surface extending along the length of a first metal rod and a corresponding, relatively long and narrow surface extending along the length of a second metal rod, and simultaneously squeezing each of said rods alongside said bond to simultaneously elongate each of said rods and to reduce the cross-sectional area of each of said rods for deforming the metal rods into respective, relatively wide and thin, elongated metal strips each having a thin lateral edge surface interfacially joined throughout said edge surface to a corresponding thin lateral edge surface of the other of said strips by means of said bond.

2. A method for making a composite edgelay thermostat bimetal material having a pair of relatively wide and thin elongated metal strips each having a thin lateral edge surface joined throughout said edge surface to a corresponding thin lateral edge surface of the other of said strips, said method comprising the steps of disposing a first rod of metal of relatively low coefficient of thermal expansion and a second rod of metal of relatively high coefficient of thermal expansion in engagement with each other along long and relatively narrow surfaces of the rods which extend along the lengths of the rods, forming an electrical resistance weld between said rods along said engaged rod surfaces, and simultaneously squeezing each of said rods alongside said bond to simultaneously elongate each of said rods and to reduce the cross-sectional area of each of said rods for deforming the metal rods into respective, relatively wide and thin, elongated metal strips each having a thin lateral edge interfacially bonded to a corresponding thin lateral edge of the other of said strips by means of said weld.

3. A method as set forth in claim 2 wherein said welded rods are heated for improving the weld between said rods prior to deforming of said rods.

4. A method for making a composite edgelay thermostat bimetal material having a pair of relatively wide and thin elongated metal strips each having a thin lateral edge surface joined throughout said edge surface to a corresponding thin lateral edge surface of the other of said strips, said method comprising the steps of advancing a rod of a first metal of relatively low coefficient of thermal expansion and another rod of a second metal of relatively high coefficient of thermal expansion between a pair of resistance welding electrodes for engaging the rods with each other along long and narrow surfaces of the rods which extend along the lengths of the rods and for engaging relatively greater surface areas of the rods with respective welding electrodes, directing electrical current between said electrodes through said rods to form an electrical resistance weld bond between said rods along said engaged rod surfaces, heating said rods to increase said bond between said engaged rod surfaces by inducing diffusion bonding between the rod materials, advancing said rods between a pair of rolls so that each rod engages each of said rolls and simultaneously squeezing each of said rods between said rolls alongside said bond to simultaneously elongate each of said rods and to reduce the cross-sectional area of each of said rods for deforming said rods into respective, relatively wide and thin, elongated metal strips each having a thin lateral edge interfacially joined to a corresponding thin lateral edge of the other of said metal strips by means of said bond.

5. A method as set forth in claim 4 wherein said rods are initially of hexagonal cross-sectional configuration and wherein said rods are advanced between said welding electrodes to engage respective flat surfaces of said rods with each other along the lengths of said rods.

6. A method as set forth in claim 4 wherein said rods are initially of round cross-sectional configuration and wherein said rods are advanced between said welding electrodes to engage long and narrow surfaces of said rods with each other along the lengths of said rods.

7. A method as set forth in claim 4 wherein said rods are initially of six-sided cross-sectional configuration each having a pair of parallel rod surfaces including a relatively long and narrow rod surface extending along the length of the rod and a relatively long and wider rod surface extending along the length of the rod, and wherein said rods are advanced between said welding electrodes to engage said narrow rod surfaces with each other and to engage said wider rod surfaces with said respective welding electrodes.

8. A method as set forth in claim 4 wherein rods are squeezed sufficiently for narrowing said bond between rods.

* * * * *